(12) United States Patent
Chase et al.

(10) Patent No.: US 11,397,441 B2
(45) Date of Patent: Jul. 26, 2022

(54) BI-DIRECTIONAL BEACON INFORMATION SYSTEM

(71) Applicants: Arnold Chase, West Hartford, CT (US); William Chase, West Hartford, CT (US)

(72) Inventors: Arnold Chase, West Hartford, CT (US); William Chase, West Hartford, CT (US)

(*) Notice: Subject to any disclaimer, the term of this patent is extended or adjusted under 35 U.S.C. 154(b) by 136 days.

(21) Appl. No.: 15/986,556

(22) Filed: May 22, 2018

(65) Prior Publication Data

US 2018/0335781 A1    Nov. 22, 2018

Related U.S. Application Data

(60) Provisional application No. 62/509,335, filed on May 22, 2017.

(51) Int. Cl.
*G05D 1/02* (2020.01)
*G08G 1/01* (2006.01)
(Continued)

(52) U.S. Cl.
CPC ........... *G05D 1/028* (2013.01); *G05D 1/0022* (2013.01); *G05D 1/0234* (2013.01); *G08G 1/0112* (2013.01); *G08G 1/0116* (2013.01); *G08G 1/0133* (2013.01); *G08G 1/0141* (2013.01); *G08G 1/0145* (2013.01);
(Continued)

(58) Field of Classification Search
CPC .............................. G05D 1/028; G08G 1/0141
See application file for complete search history.

(56) References Cited

U.S. PATENT DOCUMENTS 5,537,672 A    7/1996  Grabow et al.
5,546,311 A *  8/1996  Sekine ................... G08G 1/052
                                                      340/902

(Continued)

OTHER PUBLICATIONS

International Search Report for International Application No. PCT/US2018/033933 dated Jul. 30, 2018.
(Continued)

*Primary Examiner* — Alan D Hutchinson
(74) *Attorney, Agent, or Firm* — McCormick, Paulding & Huber PLLC

(57) ABSTRACT

An autonomous vehicle is equipped with a beacon, preferably including a transmitter and receiver, or a transceiver, for bi-directional communication, which is programmed to interact with other beacons for the exchange of contextual travel information to assist in autonomous operation of the vehicle. Beacons may be stationary and positioned along a roadway such that a signal transmitted by such a stationary beacon can be received by a passing beacon-equipped vehicle, the operation of which can be adjusted depending on instructions received from the stationary beacon. The vehicle can also transmit information to the stationary beacon, which information can be used to assess traffic conditions to thereafter adjust information and alerts sent to other beacon-equipped vehicles. Beacons located within multiple vehicles may also interact to share information that may be used by individual vehicles to adjust or maintain the autonomous operation of the vehicle.

50 Claims, 6 Drawing Sheets

(51) Int. Cl.
  *G08G 1/0967* (2006.01)
  *G08G 1/0968* (2006.01)
  *G05D 1/00* (2006.01)

(52) U.S. Cl.
  CPC . *G08G 1/096708* (2013.01); *G08G 1/096758* (2013.01); *G08G 1/096783* (2013.01); *G08G 1/096791* (2013.01); *G08G 1/096822* (2013.01); *G05D 2201/0213* (2013.01)

(56) References Cited

U.S. PATENT DOCUMENTS

| | | | |
|---|---|---|---|
| 5,928,294 A | 7/1999 | Zelinkovsky | |
| 5,983,161 A * | 11/1999 | Lemelson | G01S 19/11 |
| | | | 340/436 |
| 6,720,920 B2 * | 4/2004 | Breed | B60N 2/2863 |
| | | | 342/386 |
| 6,864,784 B1 * | 3/2005 | Loeb | G08G 1/096716 |
| | | | 180/171 |
| 7,030,777 B1 * | 4/2006 | Nelson | G08G 1/0955 |
| | | | 340/907 |
| 8,903,640 B2 * | 12/2014 | Caminiti | G08G 1/0104 |
| | | | 701/301 |
| 8,972,159 B2 * | 3/2015 | Ferreira | G08G 1/164 |
| | | | 701/117 |
| 9,031,732 B1 * | 5/2015 | Cudak | G01C 21/26 |
| | | | 701/23 |
| 9,387,928 B1 | 7/2016 | Gentry et al. | |
| 9,606,539 B1 | 3/2017 | Kentley et al. | |
| 2005/0108089 A1 | 3/2005 | Ehrman et al. | |
| 2005/0221759 A1 * | 10/2005 | Spadafora | G08G 1/09 |
| | | | 455/41.2 |
| 2008/0215231 A1 * | 9/2008 | Breed | G08G 1/161 |
| | | | 701/117 |
| 2010/0023195 A1 | 1/2010 | Traster | |
| 2012/0044046 A1 * | 2/2012 | Al-Jafar | E01F 13/085 |
| | | | 340/5.2 |
| 2014/0132207 A1 | 5/2014 | Fisher | |
| 2016/0293003 A1 * | 10/2016 | Ng | G08G 1/015 |
| 2016/0355182 A1 * | 12/2016 | Remillard | B60W 30/143 |
| 2017/0060129 A1 | 3/2017 | Ross et al. | |
| 2017/0060130 A1 | 3/2017 | Kim et al. | |
| 2017/0148313 A1 * | 5/2017 | Zografos | G06Q 10/06312 |
| 2017/0268896 A1 * | 9/2017 | Bai | G08G 1/0141 |
| 2018/0039283 A1 * | 2/2018 | Srivastava | G01S 17/89 |
| 2018/0188738 A1 * | 7/2018 | Tatourian | G05D 1/0234 |

OTHER PUBLICATIONS

Written Opinion for International Application No. PCT/US2018/033933 dated Jul. 30, 2018.

* cited by examiner

BI-DIRECTIONAL BEACON INFORMATION SYSTEM

CROSS-REFERENCE TO RELATED APPLICATIONS

This application claims the benefit under 35 U.S.C. § 119(e) of U.S. Provisional Application No. 62/509,335, filed May 22, 2017, which is incorporated herein by reference in its entirety.

TECHNICAL FIELD OF THE INVENTION

The present invention generally relates to augmenting and enhancing the remote operation of autonomous vehicles, and more particularly relates to a system for assisting in the safe and efficient operation of autonomous vehicles on public roadways, more particularly in dealing with unknown, unexpected or unpredicted traffic situations or driving conditions on the roadway.

BACKGROUND OF THE INVENTION

Many companies are developing autonomous vehicles for commercial and personal use on existing roadways for a variety of applications, including but not limited to personal taxi services, delivery services, and the like. In accordance with the present invention, an autonomous vehicle is a vehicle capable of operating without a human driver. Such vehicles can be designed to operate utilizing an onboard computer and a system of sensors designed to drive, steer, and otherwise operate the vehicle in the same manner as if there were a human operator. It is envisioned that fleets of autonomous vehicles will soon be available, similar to a network of taxis, buses or delivery vans, whereby a user can request an autonomous vehicle to pick-up, transport and drop off passengers, or pick-up, transport, and deliver packages, or the like on demand. Alternatively, users can own an autonomous vehicle for personal use and use it for ordinary tasks, such as commuting to work, running errands, dropping the kids off at school, for travel, or the like.

Current autonomous vehicles in the development and testing stages generally utilize multiple systems to fully operate the vehicle without a human operator. First, a standard GPS system is used to plan a route for the vehicle. Taking into account the starting point and the destination for a trip, as well as other factors such as traffic conditions, road closures, preferred routes, toll roads, etc., the GPS system determines the best route for the vehicle to take. However, for safe and efficient operation, autonomous vehicles also need a system to recognize dynamic conditions along the route during operation of the vehicle. Such a system may be referred to as a differential GPS system, which utilizes an array of technologies, such as cameras, sensors, radar, lidar and lasers to provide a three-dimensional view around the vehicle during operation. Such a system can keep track of other cars around the vehicle, detect obstacles or hazards around the car or in the road up ahead, and determine the location of the edge of the road or travel lane, upcoming turns, hills or descents, and assess general road conditions ahead, behind and around the vehicle. Autonomous vehicles also require a centralized system within the car to process the information provided from the GPS system and differential GPS system and utilize the processed information to operate the vehicle. Such commonly utilized systems generally include a Computer Area Network (CAN) Bus in the vehicle.

Non-autonomous vehicles also utilize similar technology to back-up a human driver. For example, cars have used various forms of cruise control for decades. More recently, cars have been equipped with systems that will autonomously parallel park the car. Many modern cars are now equipped with systems that assist the driver when the car begins to drift out of its lane on the highway, or brake the car if it is getting too close to the car in front of it, or alert the driver if there is an object in the road ahead.

Until guidance systems on-board autonomous vehicles match or exceed the perception and analytical decision-making ability of human drivers, there will be numerous ongoing daily situations which will frustrate the ability of a full autonomous vehicle to properly and dynamically respond to, or react to, its surroundings. Moreover, until autonomous vehicles can safely rely upon its operational systems and sensors to safely and efficiently operate a vehicle and eliminate essentially all risks, the public will continue to be hesitant to put full faith in true autonomous operation of such vehicles.

As a result, there exists a need for additional or improved interfaces between automated vehicles and their surroundings. The U.S. Department of Transportation's (USDOT's) Connected Vehicle Program has proposed efforts primarily designed to "enable cars, buses, trucks, trains, roads and other infrastructure, and our smartphones and other devices to 'talk' to one another." More particularly, the USDOT's Program requests that "Cars on the highway, for example, would use short-range radio signals to communicate with each other, so that every vehicle on the road is aware of where other nearby vehicles are. Drivers would receive notifications and alerts of dangerous situations, such as a potential red-light violations; icy roads ahead; or an oncoming car, out of sight beyond a curve, swerving into their lane to avoid an object on the road." However, this initiative and other similar projects, as of yet, do not allow autonomous vehicles to fully address the challenges facing them for true autonomous operation and proper safe and efficient driverless operation. As a result, no system has been developed that can fully accomplish the goals of the USDOT Program.

While the existing level of "on-board" sensors, cameras, devices, and interfaces can alter an autonomous vehicle's driving characteristics to a limited degree (e.g., by braking for unexpected obstacles and/or other vehicles, or steering a vehicle if it drifts out of its lane), there is currently an inherent extreme deficiency with making autonomous vehicles be able to react properly to complex, atypical, or unexpected infrastructure challenges and roadway conditions, unusual vehicles (and their operations), and obstructions and obstacles on the roadway, as well as harsh ambient conditions such as fog, snow or heavy winds that can confuse or render useless many optically dependent sensors.

It has proven most daunting to operate a vehicle autonomously under any and all conditions due to the inherent difficulties of requiring a vehicle to make a real-time decision n view of unusual, unexpected or unpredicted situations. Even under ideal ambient conditions, the CAN bus of the vehicle must coordinate a considerable number of sensors, and requires extensive analytical processing power to merely allow the vehicle to try to identify what an unusual or unexpected object is during operation, with very little time to actually detect, recognize and react appropriately. Further, even if the vehicle is able to identify an object or situation, there is still a challenge with having the vehicle then attempt to figure out what the correct procedural response should be. As there are almost an infinite number of potential scenarios which require an appropriate response by the autonomous vehicle, this again proves to be exceedingly difficult, if not impossible, given the limitations of having a constrained amount of on-board processing power and database size in the vehicle, as well as little real time available for a response. Given that there are so many unknown or unpredicted situations, a better approach to autonomous vehicle guidance is still needed.

Accordingly, there is a need for an improved system for the operation of an autonomous vehicle for identifying unknown, unexpected and unpredicted situations or conditions on a roadway that overcomes the drawbacks and limitations of existing dynamic guidance systems. Further, there is a need for a system that utilizes dynamic information obtained and/or received from roadway infrastructure and/or a network of vehicles on a roadway that will assist in the safe and efficient operation of vehicles in response to unknown, unexpected and unpredicted situations or conditions on a roadway, and that will aide the vehicles in determining responsive actions in a quick and expeditious manner.

SUMMARY OF THE INVENTION

A Bi-Directional Beacon Information System (BBIS) in accordance with the present invention provides a better approach for assisting in the safe and efficient operation of an autonomous vehicle on public roadways, particularly in dealing with unknown, unexpected or unpredicted conditions on the roadway. In a first aspect of the present invention, the BBIS uniquely supplies an autonomous vehicle with instant object/situation identification and awareness. This system essentially takes the enormous sensing and processing burden of an autonomous vehicle needing to recognize a new problem situation (and immediately coming up with a proper response) from the vehicle itself by having a network of BBIS beacons readily available to transfer alerts, information and recommended responses to the vehicle, which can adapt its operation accordingly.

In an embodiment of the present invention, a system for transmitting contextual travel information to vehicle on a roadway comprises at least one bi-directional beacon including transmission means and receiver means for sending and receiving data relating to contextual travel information for assisting in operation of vehicles on the roadway. Additionally, the at least one beacon is positioned on one of a stationary support located proximate to the roadway or a vehicle adapted for travel on the roadway.

In embodiments of the present invention, an autonomous vehicle is equipped with a BBIS beacon, preferably including a transmitter and receiver, or a transceiver, for bi-directional communication, which is programmed to interact with other BBIS beacons for the exchange of information. In this regard, the system for transmitting contextual travel information comprises a plurality of autonomous vehicles each having a processor in operative communication with the vehicle's autonomous operating system and a bi-directional beacon system in operative communication with the processor. Data is exchanged between vehicles in the system, and data received by each said vehicle is processed by the processor for assisting in operation of each said vehicle.

In a first aspect of the present invention, BBIS beacons may be stationary and positioned along a roadway such that a signal transmitted by such a stationary BBIS beacon can be received by a passing BBIS-equipped vehicle. The BBIS-vehicle can also transmit information to the stationary BBIS beacon, which information can be used to assess traffic, weather, or other conditions and the like to thereafter adjust information and alerts sent to other BBIS-equipped vehicles.

In a second aspect of the present invention, BBIS beacons located within multiple vehicles may interact to share information that may be used by individual vehicles to adjust or maintain the autonomous operation of the vehicle.

In accordance with the present invention, a BBIS can also simultaneously supply an autonomous vehicle with encrypted pre-determined suggested action responses, as necessary. Therefore, BBIS beacons, both stationary and mobile, can provide situation-specific information, preferably with well-reasoned and optimum action guidance instructions, such as, for example, a preferable detour when there is a road closure due to an accident or an obstruction in the road. Such action guidance instructions may be pre-set or pre-programmed and already be located inside a beacon or the autonomous vehicle operating system, and can be supplied to the autonomous vehicle when the specific situation arises. Alternatively, BBIS beacons can be programmed in real time with optimal action guidance instructions to pass to BBIS-equipped vehicles, for example, in an emergency situation requiring an immediate and specific response protocol. Upon receipt of such action guidance instructions, each autonomous vehicle merely needs to carry out those instructions. Moreover, in accordance with the present invention, BBIS-equipped vehicles can interact with one another to pass on such information throughout a network of vehicles, thereby alerting vehicles several miles away of an upcoming emergency situation.

Additionally, a unique inherent property of a BBIS beacon in accordance with the present invention rests in the basic configuration of the beacon itself, which adds a receiver and logic to the transmitting beacon, which then allows full bi-directional interactivity between the BBIS beacon and any BBIS-equipped vehicle. A BBIS beacon may operate either from a fixed location (e.g., mounted to a road-side post, a street sign, a traffic light, a building, or the like), or from within a moving vehicle. Thus, each BBIS beacon can both send and receive data, for example, between a BBIS-equipped vehicle and a stationary BBIS beacon on the side of the road, or between passing BBIS-equipped vehicles. A BBIS beacon is able to receive motion status (e.g., stopped or moving), motion direction (forward or back), and speed of movement from all BBIS-equipped vehicles within range.

As noted, a BBIS beacon may include a transmitter and receiver, or alternately a single transceiver capable of bi-directional operation. A BBIS beacon may either operate in an Omni-directional fashion, or a directional fashion by using integral highly directional or sector antennas. A BBIS beacon may operate at various transmission power levels as well. Each BBIS beacon preferably may be programmable with transmittable information.

In accordance with embodiments of the present invention, every BBIS-equipped vehicle can include a unique on-board database of vehicle-specific information such as the host vehicle's Vehicle Identification Number (VIN), State motor vehicle license-plate information, vehicle type, vehicle size, vehicle height, vehicle weight, "Haz-Mat" applicability, etc. The information can also be adapted in use of the vehicle, for example to account for a varying number of passengers, the amount and weight of luggage or stowed items, the vehicle's remaining range capability, the vehicle's maintenance status, the vehicle's home location and destination location, etc.

Although the present system is primarily designed to work with autonomous vehicles, much of it is also of benefit for human-driven vehicles as well, acting as a back-up to the human operator to improve safety. As the balance between autonomous vehicles and driven vehicles on the roads tips in favor of autonomous vehicles, at some point the "driven" vehicles will increasingly need to be equipped with BBIS beacons to safely operate in the "new" autonomous environment. Moreover, the exchange of information provided by the BBIS in accordance with the present invention can enhance operation of all vehicles, including human-operated vehicles, by providing useful "heads-up" information about traffic conditions and rush hour updates, accidents, road closures, trees down, objects in the road, disabled vehicles, road maintenance, parade route, drawbridge opening, school zones, emergency vehicles on the side of the road, and the like.

Objects, features and advantages of the present invention will become apparent in light of the description of embodiments and features thereof, as enhanced by the accompanying figures.

DETAILED DESCRIPTION OF EMBODIMENTS OF THE INVENTION

Figure 1A:
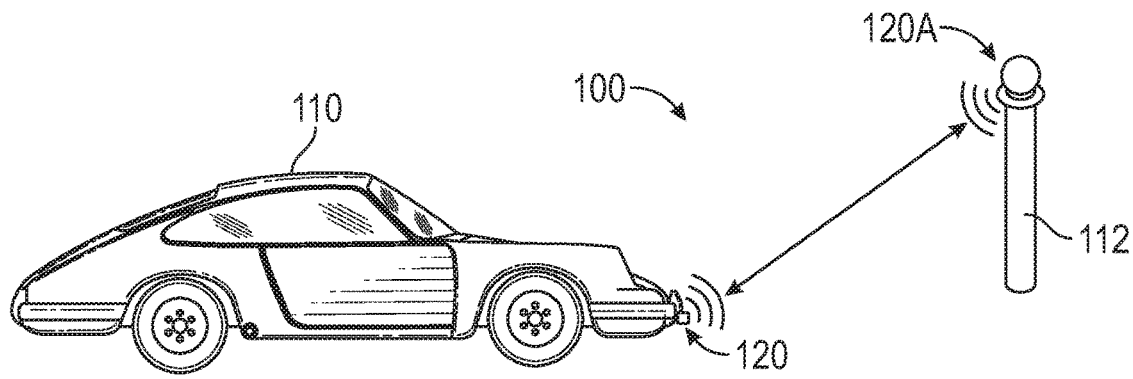
FIGS. 1A and 1B illustrate side and top schematic views, respectively, of a first aspect of a bi-directional beacon information system in accordance with the present invention involving vehicles with mobile beacons interacting with a stationary beacon.
Figure 1B:
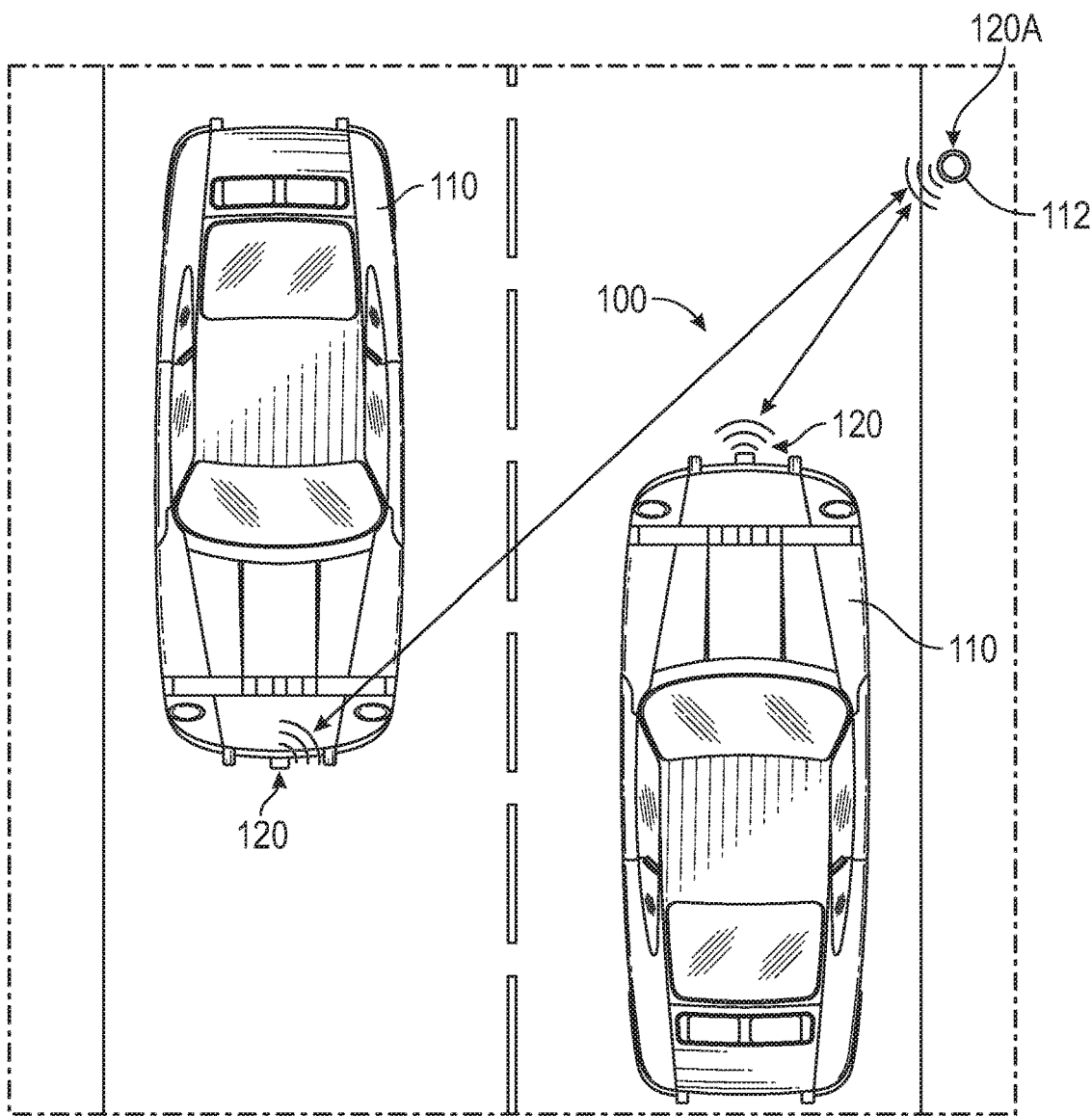
Figure 2A:
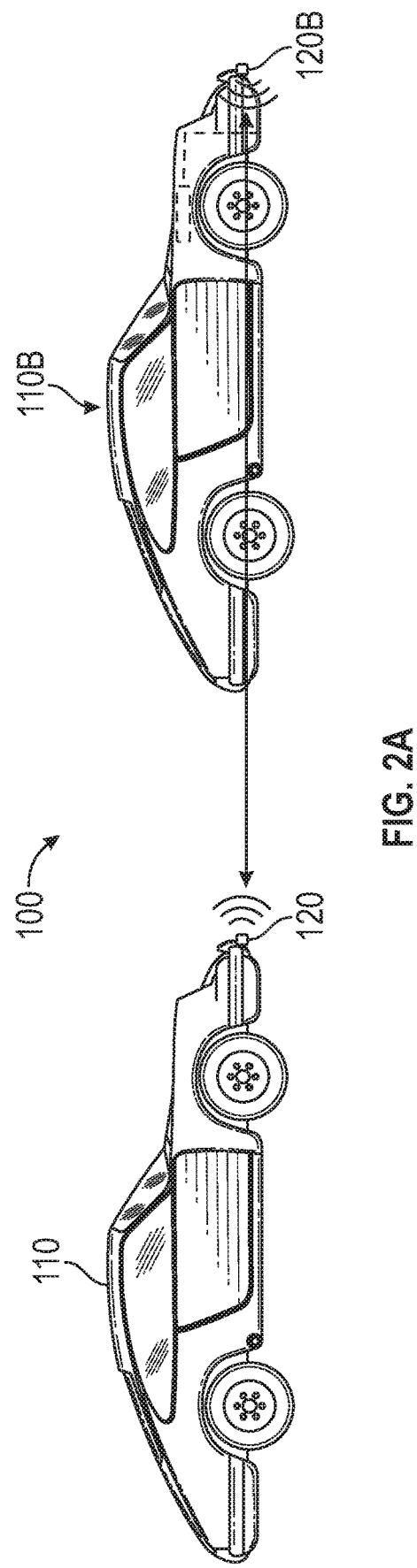
FIGS. 2A and 2B illustrate side and top schematic views, respectively, of a second aspect of a bi-directional beacon information system in accordance with the present invention involving multiple vehicles with mobile beacons interacting with one another.
Figure 2B:
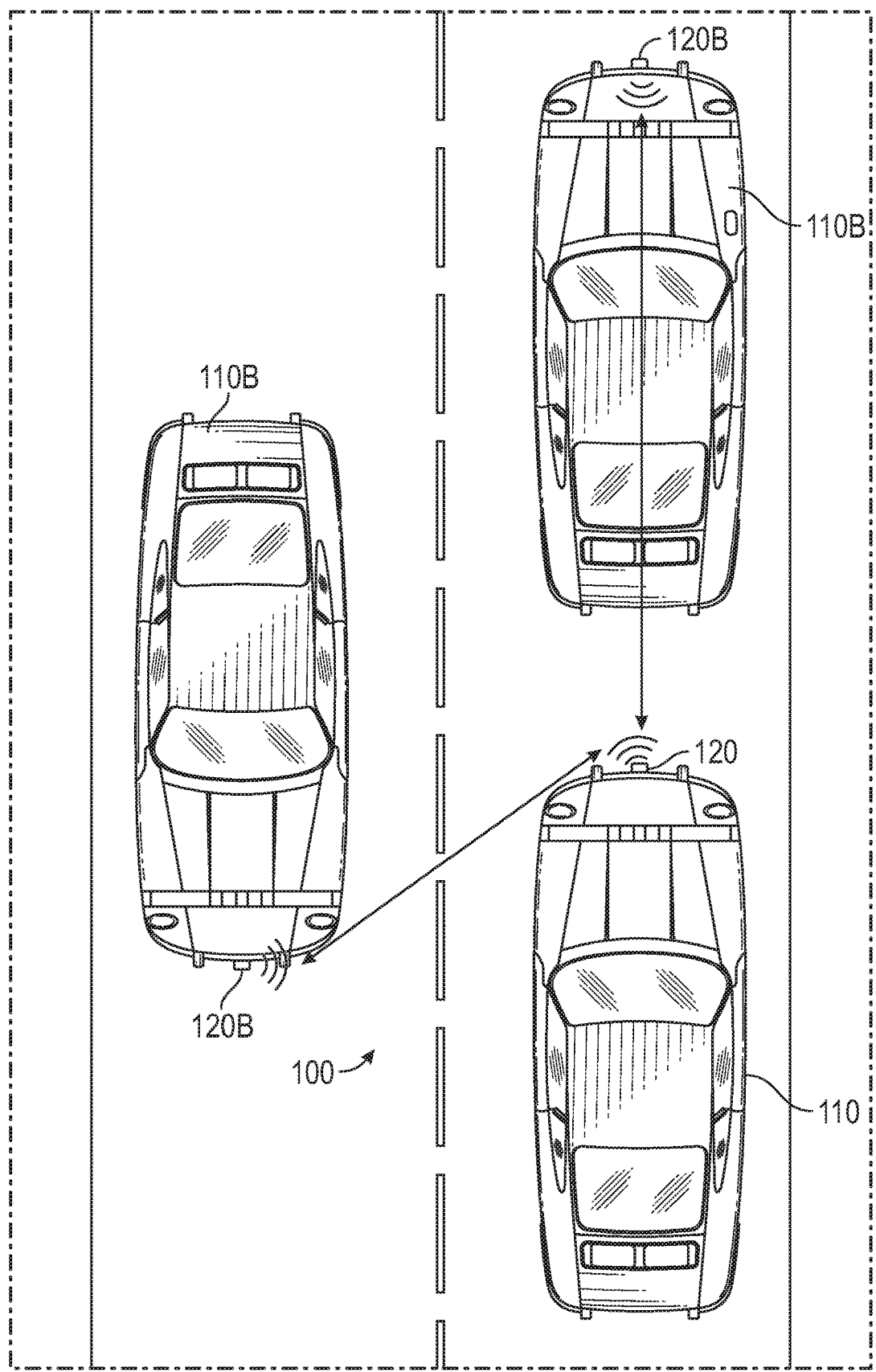
Figure 4:
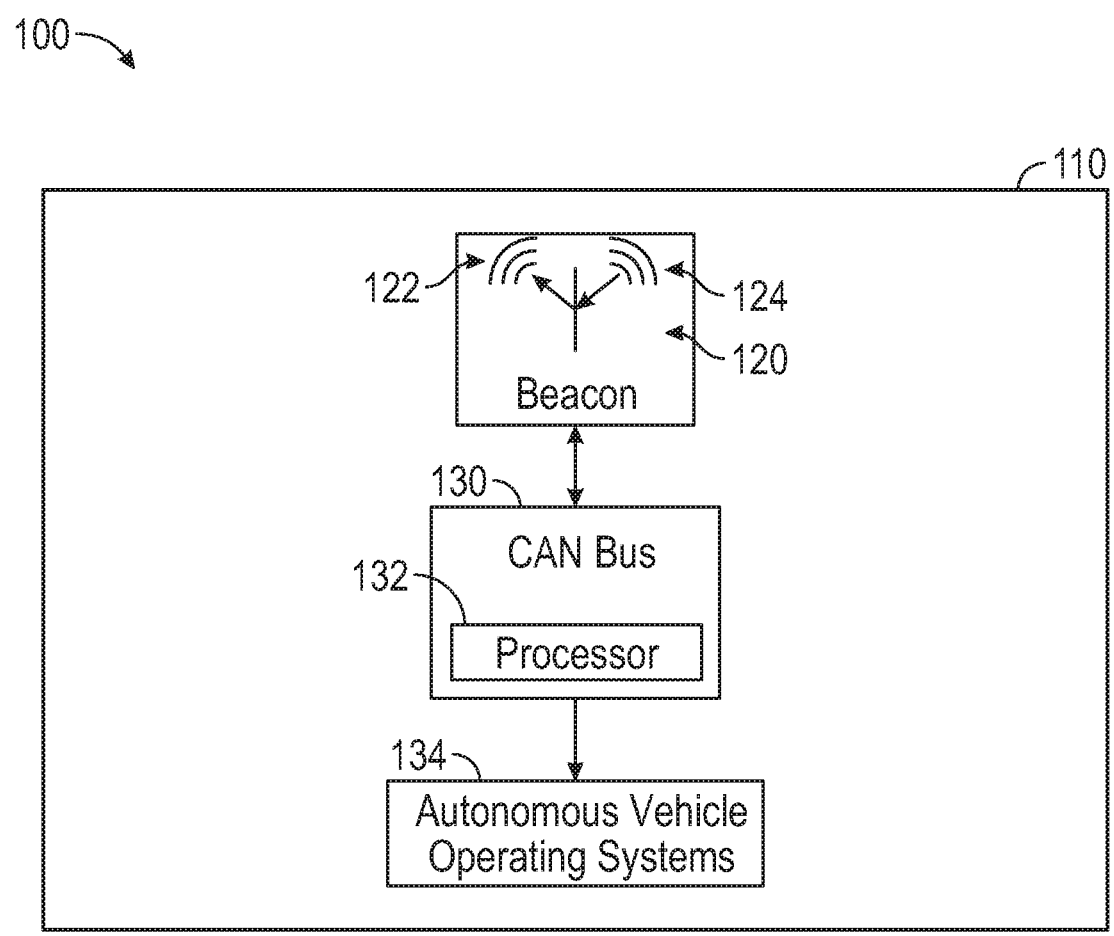
FIG. 4 provides a schematic representation of a beacon-equipped vehicle in accordance with the present invention.

Exemplary embodiments of a BBIS in accordance with the present invention are illustrated in FIGS. 1 and 2, and generally designated by reference numeral 100. As shown, an autonomous vehicle 110 is equipped with a BBIS beacon, general designated by reference numeral 120 and which preferably includes a transmitter 122 and a receiver 124, or alternatively a singular transceiver, for bi-directional communication. As illustrated in FIG. 4, the BBIS beacon system is in operational communication with a CAN Bus 130 disposed on the vehicle 110, which communicates with or includes a processor 132 handling autonomous operation of the vehicle 110 in combination with the vehicle's operating systems, GPS system, differential GPS system, and the like, generally represented as reference numeral 134.

Preferably, the BBIS beacon 120, which includes the transmitter 122 and receiver 124, is located on the vehicle 110 in a position where it can pick up transmissions from other beacons 120 with minimal interference. As illustrated in FIG. 1, a BBIS beacon 120 is located on the front of the vehicle 110 for illustration purposes. The beacon 120 can be positioned elsewhere on the vehicle without departing from the spirit and principles of the present invention, such as on the back or roof of the vehicle 110. Still further, the vehicle can use a network of beacons 120 positioned around the vehicle 110 so as to enhance the vehicle's ability to pick up signals from other beacons 120 regardless of the vehicle's speed or location of a roadway, traffic congestion, weather conditions, or the like. So, for example, a vehicle 110 could include a front beacon and a rear beacon, both of which provide signals to the BBIS system 100 before being sent to the CAN Bus 130 to adjust or maintain operation of the vehicle 110.

The BBIS beacon 120 is programmed to interact with other BBIS beacons 120 for the exchange of contextual travel information. In accordance with the present invention, and as illustrated in FIG. 1, a BBIS beacon 120A may be stationary and positioned along a roadway on a stationary support, generally designated as reference numeral 112, such that a signal transmitted by such a stationary BBIS beacon 120A can be received by a passing BBIS-equipped vehicle 110. The BBIS-vehicle 110 can also transmit contextual travel information via its BBIS beacon 120 to the stationary BBIS beacon 120A, which information can be used to assess traffic conditions and the like to thereafter adjust contextual travel information and alerts sent to other BBIS-equipped vehicles. The stationary beacons 120A have the capability of being remotely programmed by appropriate authorities, such as police and fire departments, the Department of Transportation, or other federal agencies, such as Homeland Security or FEMA. Exemplary stationary supports 112 can be a post, street sign, traffic light, guard rail, building, bridge, tunnel, and the like.

As illustrated in FIG. 2, BBIS beacons 120B can be located within multiple vehicles, which may interact to share contextual travel information that may be used by individual vehicles to adjust or maintain the autonomous operation of the vehicle 110. In this regard, vehicles 110 can effectively speak with each other and learn pertinent information about the other vehicles 110 that can assist in autonomous operation of each vehicle 110. For example, a vehicle 110 can keep track of the speed of other vehicles in front of, behind and to each side of it. It can also temporally exchange route information with other nearby vehicles, so that it may know that a certain vehicle in the left lane will need to change lanes soon to take an approaching right-hand exit. Likewise, another vehicle may pass along contextual travel information passed to it form a third vehicle, providing an alert of an accident ahead on the roadway.

Each type of beacon 120, be it stationary or mounted within a vehicle 110, can also report observed data or dynamic changes through operation to appropriate authorities for review and roadway condition and situational awareness.

Each BBIS beacon 120 may either operate in an Omni-directional fashion, or a directional fashion by using highly directional or sector antennas. Each BBIS beacon 120 may operate at various transmission power levels as well. Each BBIS beacon 120 preferably may be programmable with transmittable contextual information.

In accordance with the present invention, every BBIS-equipped vehicle 110 can include a unique on-board database of vehicle-specific information such as the host vehicle's Vehicle Identification Number (VIN), State motor vehicle license-plate information, vehicle type, vehicle size, vehicle height, vehicle weight, "Haz-Mat" applicability, etc. The information can also be adapted in use of the vehicle 110, for example to account for a varying number of passengers, the amount and weight of luggage or stowed items, the vehicle's remaining travel range, the vehicle's maintenance status, the vehicle's home location and destination location, etc. The information is utilized in combination with any guidance instructions received when modifying operation of the vehicle 110, such as, when instructions are received to adjust speed, alter course, etc.

A BBIS beacon 120 is able to receive motion status (e.g., stopped or moving), motion direction (forward or back), and speed of movement from all BBIS-equipped vehicles 110 within range. In the event a BBIS beacon 120 receives, for example, a plethora of stopped vehicle reports (i.e., zero motion), in an area of a short time frame, that beacon 120 can be used to convey an accident or road closure situation to local authorities, and well as provide approaching vehicles 120 of the situation. In this regard, a BBIS beacon 120 would have the capability to slow down all vehicles for a given distance in the case the roadway has been affected or shut down by an event—such as an accident, a downed tree, an oil slick, or black ice. This approach is beneficial when the roadway is otherwise visually normal, or appears normal to other sensors, whereby such sensors would ordinarily react.

Prior art Infrastructure-to-Vehicle (I2V) and Vehicle-to-Vehicle (V2V) messaging merely lets autonomous vehicles become aware of another vehicle or infrastructure's existence. The BBIS 100 in accordance with the present invention goes beyond this basic object-detection approach in several separate and distinct ways.

To begin with, instead of the existing V2V conceptual infrastructure having transmitters, or "beacons", simply sending out a signal that just telegraphs the existence and potentially the specific location of an object, vehicle or situation, BBIS beacons 120 in accordance with the present invention additionally send out actual contextual travel information, and preferably "procedural commands", to nearby autonomous vehicles 110—essentially allowing a vehicle 110 to "think ahead" and take advantage of extra time to determine a safe course of action in view of a detected situation. Such transmitted information and "procedural commands" may be coded with one of numerous actionable "priority levels", which range from suggested actions to mandatory explicit direct vehicle commanding. At the lowest priority levels, the "procedural commands" consist of identifying the situation (e.g., traffic congestion ahead; disabled vehicle on right side of road) and recommended suggestions for the optimum response of the autonomous vehicle 110 given the contextual situation in which the vehicle 110 finds itself (e.g., slow speed; shift to left lane). For example, a BBIS beacon 120 installed in a school zone would be capable of automatically changing the maximum speed of an autonomous vehicle 110 to comport with desired speed limits in effect at certain times of the day, and days of the week, adjusted for holidays and summer hours. Similarly, highways and exit ramps often have varying speed limits. A BBIS beacon 120 that is substituted for a regular V2I beacon adds the capacity to command any compatible vehicle 110 to not exceed speeds at all locations of the highway and exit ramps. By placing a new BBIS beacon 120 at every speed limit change location, the vehicle 110 is able to dynamically follow all set speeds.

At the highest priority levels, the messages are explicit commands to the autonomous vehicle 110 to immediately and unequivocally take an action without further review or modification. This level of command would be used, for instance, in a situation where an autonomous vehicle 110 is relying on GPS mapping data (which is non-real-time data) on a roadway which has suddenly been compromised or rendered unsafe or life-threatening for travel (e.g., roadway washout, bridge collapse, fallen tree, car accident, hazardous spill, bomb alert, active shooter situation, etc.). A typical unequivocal command would be for the autonomous vehicle 110 to immediately halt any further forward motion, and modify the vehicle's guidance to add new waypoints, which would automatically re-route the vehicle 110 away from and around the danger. In this regard, emergency protocol could be programmed into stationary BBIS beacons, or temporarily-set BBIS beacons 120, which would typically be used by police, fire, and federal departments, which could then pass information and commands to BBIS-equipped vehicles. Moreover, alert information received by BBIS-equipped vehicles could then be passed from vehicle to vehicle so that vehicles many miles away could be alerted of the emergency situation well in advance of getting caught in traffic and could be steered along a different route completing bypassing the emergency.

While many GPS systems have the capability to "detour" around an area, this re-routing is commonly based on "blind" re-routing, and does not, and cannot, take into consideration "real-time" data or situation requirements that may be critical in making the optimal and correct re-routing decisions. An example of this would be a situation that closes down a major highway, requiring all traffic to be re-routed off of the highway, and onto local streets. Normally, a GPS-based guidance system would attempt a re-route over the nearest roads to get back onto the highway with the shortest route available, even if that were not the preferred route desired by local authorities. With BBIS beacons 120, the local authorities can easily and quickly re-program the requisite stationary beacons 120A to instruct BBIS-equipped vehicles 110 take a route that would be best suited for the volume and types of traffic, and not just the shortest or quickest route (which might not be available or desirable for independent reasons). Without BBIS beacons 120, for example, if a toxic chemical spill closed down a highway, a typical GPS re-routing would suggest the closest alternative path to the toxic area, which is inapposite to the correct procedure needed. Moreover, as noted, once a BBIS-equipped vehicle 110 has received instructions alerting the vehicle 110 of the spill (or other emergency situation) as well as appropriate commands (e.g., stop immediately; do not use Route X; take the following detour; etc.), that vehicle 110 can pass on contextual travel information to other nearby vehicles 110 such that important information can be relayed—vehicle to vehicle—for miles, allowing distant vehicles to alter speed, routes and preferences well in advance of hitting traffic or requiring last second adjustments. This approach can also alleviate congestion and allow emergency vehicles access to an accident or emergency situation, as necessary.

An example of a mid-level BBIS "command" message can be illustrated with a scenario wherein an autonomous vehicle 110 were to come upon a slow moving vehicle or a vehicle that makes several stops, such as a mail delivery truck, a garbage truck or a street sweeper. Typical autonomous driving guidance (using the vehicle's on-board sensors and programming) would characteristically slow the vehicle's speed down to match that of the vehicle ahead, and continue to match the programmed following distance between itself and the vehicle ahead according to the usual pre-programmed parameters. Assuming this example was taking place on a one-lane (in each direction) roadway, without BBIS 100, the autonomous vehicle 110 would slowly keep following and stopping in lockstep with the lead vehicle. With a BBIS implementation, the lead vehicle would transmit a signal identifying itself (through a BBIS beacon 120 associated with the vehicle) as being a "passing allowed, non-traditional slow moving vehicle" that was in the process of making continuous periodic stops.

A vehicular BBIS beacon 120B (e.g., an autonomous vehicle 110 that has already passed the slow moving vehicle)

is also capable of passing through to other BBIS-equipped vehicles 110 its analysis of the traffic ahead of the slow moving vehicle, and provide contextual travel information to trailing vehicles whether it is safe for other to pass said slow-moving vehicle. The previous vehicle beacon, as well as a GPS system in the current autonomous vehicle 110, can also assess and supply contextual information of the upcoming roadway conditions—such as, safe to pass, or turn up ahead, or oncoming traffic, or stop sign ahead. Alternatively, said vehicle's BBIS beacon 120B would also signal to a following vehicle 110 its suggested action response, which would have the following autonomous vehicle 110 increase its forward sensor sensitivity (as would typically be the case when carrying out a passing attempt), temporarily suspend its normal "do not cross the center median" rules, and (if safe) request the following vehicle 110 to go around and in front of the slow moving vehicle without exceeding the speed limit. Once in front, the autonomous vehicle 110 would be free to resume "normal" driving behavior, and in accordance with the present invention, supply contextual travel information to other vehicles that may be approaching the slow moving vehicle, either via the pass-off chain described above, or by alerting a nearby stationary BBIS beacon 120A of the slow moving vehicle.

Equally illustrative is the example of a non-BBIS equipped autonomous vehicle trying to recognize a particular type of vehicle ahead, such as a school bus, which often cannot be passed when stopped as a matter of law. Even with complex on-board sensors and processing trying to identify such a school bus, the plethora of different sizes, shapes, and types of vehicles that are used as school buses make merely identifying this type of vehicle extremely difficult. Even if an autonomous vehicle were successful in correctly identifying such a vehicle, there is the further problem of the autonomous vehicle trying to figure out how to respond to it after detection and accurate identification. Given that a school bus undergoes several operational "modes" (depending on if it is loading/unloading passengers, off-duty, disabled at the side of the road with its emergency flashers on, etc.), the response on the part of the autonomous vehicle needs to be mode dependent and requires more information that merely detecting a locational beacon, or even determining that the vehicle is a school bus. With the present BBIS invention, each vehicle used as a school bus and containing BBIS equipment would transmit one of several available command messages, each synchronized to whatever mode the bus was operating in at that time. There would be no action ambiguity whatsoever on the part of any other BBIS-equipped vehicle 110 in that all the complex sensory and logic requirements would be superseded by the mere receipt of a simple identification message such as "school bus actively loading/unloading-passing NOT allowed", as well as a high-priority "stop" command if a school bus were stopped with its flashing lights on. This command would override any normal AV movement protocols, which would effectively halt all traffic around the subject school bus, ensuring safe loading and unloading of the school bus at a stop. Compare this approach to a conventional V2V message that would only let any nearby vehicles know that there was a school bus in close proximity.

While BBIS equipment in accordance with the present invention is "backwards" compatible, with the ability to receive conventional V2V or V2I messaging, it can also operate with a "dual mode" receive/transmit capability to allow both reception and transmission of additional proprietary BBIS messages or vehicle information. In this regard, the BBIS signals/messages not only provide the "base" V2V category or nature of the message, but also uniquely provide preprogrammed information about a vehicle 110 associated with a particular beacon 120, which can be used to generate recommended command guidance to be transmitted to the vehicle 110, as necessary. A typical example would be a local roadway that is temporarily blocked off to regular traffic (for example, with orange traffic cones set up, yet with enough space to let a vehicle get through perhaps guided by a person when safe to proceed) displaying "Local Traffic Only", "No Through Traffic", or "Road Closed" signs. With a conventional V2I system, a V2I "beacon" could transmit a "Road Closed" message to an autonomous vehicle. A typical autonomous vehicle might recognize the V2I message and invoke a "generic" response, but it would not necessarily be the correct or optimal contextual one, or also may not be able to safely navigate the roadway. If a beacon 120, for example, located at the site of a road blockage, transmitted "Local Traffic Only" or "No Through Traffic" messages, a typical autonomous vehicle would not know how to react to those. A BBIS-equipped vehicle 110, however, would contain a BBIS receiver/decoder, which includes a user-programmable database of on-board information, including the vehicle's "home" location. If the vehicle 110 were proceeding to its "home" location, even if the location had only a conventional "Local Traffic Only" message beacon, the in-vehicle BBIS equipment would recognize that the "home" location was on the blocked-off street, and would direct the subject vehicle 110 to continue to proceed to its home location. If the construction location had a "dual-mode" BBIS beacon 120, then the beacon 120 (after being programmed in the field) would direct any BBIS-equipped vehicle 110 around the closed street via a preferred route that the municipality had recommended and pre-programmed into the beacon 120.

Similarly, if a road was not closed, but instead was being resurfaced leaving only a stone or dirt surface, a BBIS beacon 120 would instruct the vehicle's cameras to change to a "high sensitivity", or side guidance priority mode to better detect protruding objects, side curbs, etc., in the absence of any street markings.

Similarly, if a bridge or roadway had a height and/or weight limitation marked as "No trucks over xxx lbs. or height", the BBIS's receiver database would already have the host vehicle's size, weight, height, etc., information entered into it, and would explicitly prevent the vehicle 110 from attempting to use the restricted infrastructure if the parameters were to be exceeded. The same holds true for vehicle's trying to use restricted-use parkways that prohibit certain types of vehicles from operating on roadways, either full-time or during certain days/hours.

The bi-directional nature of the BBIS system 100 enables a roadside stationary BBIS beacon 120A, which is transmitting out constant guidance information to passing vehicles 110, for example, "speed limit", "reduce lanes" or "roadway condition" information, to dynamically adjust its information as needed. For example, the transmitted contextual information can be adjusted based on known traffic patterns, such as rush hour congestion. In the alternative, feedback from passing vehicles 110 can inform the roadside beacon 120A, and possibly a remote centralized control center monitoring information received at designated roadside beacons 120A, of traffic patterns and cause factors such as speed limits and available lanes of travel to be adjusted so as to optimize travel conditions. Indeed, the BBIS 100 can dynamically adjust transmitted speed limits by making constant inquiries to passing vehicles 110 monitoring current travel speeds, or requesting from them any recent anti-skid system or anti-lock braking episodic records within a time frame that is determined by the BBIS beacon 120A or the centralized control center. Positive activation reports would decrement the speed limits sent by the BBIS beacon 120A until the reports disappeared, and the lack of reports would increment the speed limits up to its former level. The BBIS 100 could also dynamically optimize the passing vehicles' anti-skid and other weather sensitive systems based on reports from other vehicles correlating to certain weather and roadway conditions. These functions would also be useful and could be utilized by non-autonomous vehicles as well.

The BBIS-equipped vehicle 110 can also have means for storing information received via the BBIS network 100 in a database for future reference. For example, information transmitted from stationary BBIS beacons 120A relaying contextual information about certain high-traffic areas and times can be stored in a vehicle's memory for further travel in the same areas at the same times, and which can be taken into account for future routing of the vehicle. The database can be constantly updated. A BBIS-equipped vehicle 110 overcomes a vehicle's reliance on a finite and limited number of pre-determined messages which the vehicle 110 could recognize, as well as a commensurate limited number of pre-determined vehicle responses. As with any fixed data set, they immediately become limited, outdated and cannot deal with any new or overlooked (by the fixed data set) situation, or any unique, spontaneous or temporary circumstances affecting the normal travel progress of an autonomous vehicle 110. Despite such vehicles 110 generally having an on-board database of commonly expected "objects" along with the programmed actions that would rigidly be taken with them, there will always be additional objects or situations that will require unique responses that are not already "hardwired" into a vehicle's guidance system. Accordingly, the BBIS accounts for constant updating of the database of situations, scenarios, objects and appropriate responses, all for the end result of improving safe and efficient operation of the vehicle 110.

Figure 3A:
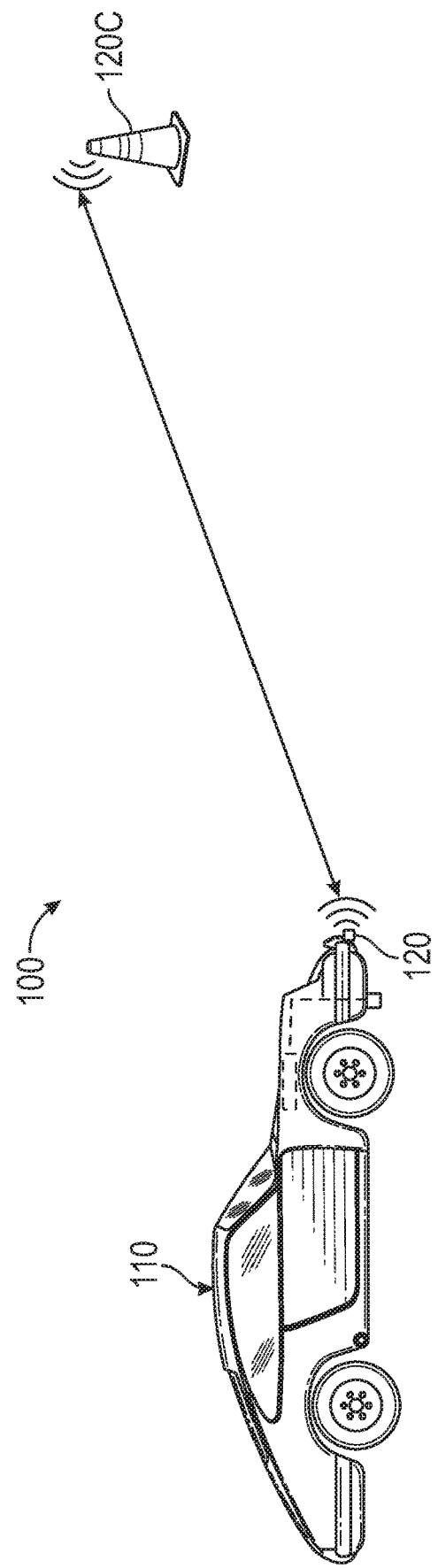
FIGS. 3A and 3B illustrate side and top schematic views, respectively, of a third aspect of a bi-directional beacon information system in accordance with the present invention involving a vehicle with a mobile beacon interacting with temporary beacons.
Figure 3B:
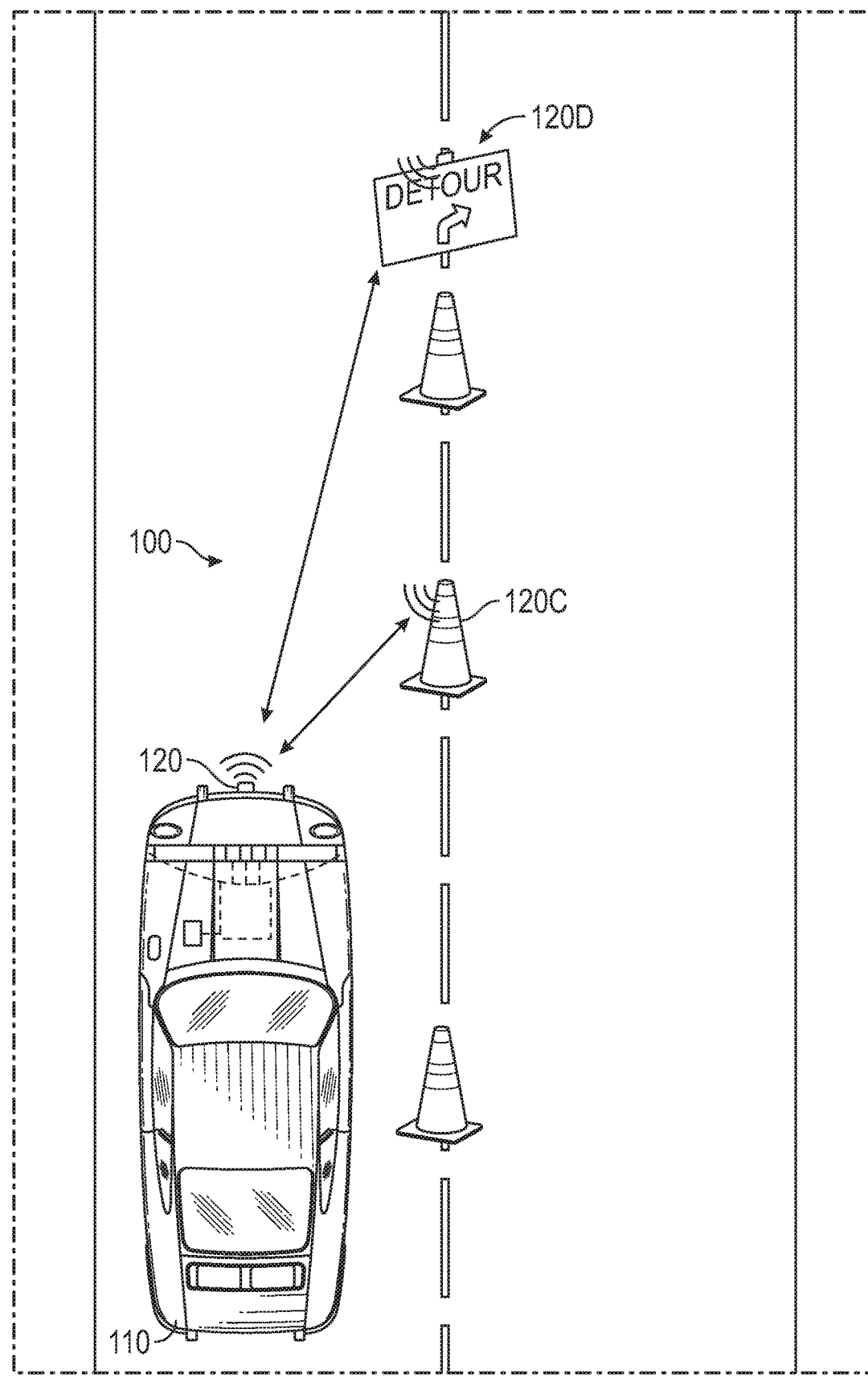

Referring to FIG. 3, a temporary BBIS beacon 120C could also be used to provide specific detail to passing BBIS-equipped vehicles. In this regard, the temporary beacon 120C would generally operate in the same fashion as a stationary beacon 120A, but could be provided in a traffic cone, temporary signage or an emergency light or flare, positioned as necessary by police or construction crews, to provide alerts and recommended command guidance—such as, "Local Traffic Only", "No Through Traffic", "Detour Routes", etc. Further, if there is construction or a disabled vehicle, for example, and the travel lanes are shifted from the ordinary layout of the road—and thus contrary to what would be programmed in a standard GPS signal—the temporary BBIS beacon 120C could guide the vehicle 110 along a detour route or assist with a lane shift to avert posing a danger to a construction crew, a parked emergency vehicle, or a disabled vehicle on the side of a road. In the event a dangerous local condition such as downed high-voltage wires or large trees across a roadway were to occur that could not be fixed for an extended time frame (such as in the aftermath of a major storm), temporary BBIS beacons 120C, 120D could be manually placed near the hazardous location and preferably preprogrammed to automatically create a "do not enter" zone around the problem. Optionally, the BBIS beacons 120C, 120D could provide alternate routing to autonomous vehicles 110 to allow them to bypass the specific area.

In temporary situations where only a single travel lane is available for two-way traffic, a pair of BBIS beacons 120 could competently assist traffic control personnel in directing autonomous vehicles 110. For example, one such beacon 120 would be positioned at either end of the single travel lane, stopping traffic in one direction to let vehicles travelling in the opposite direction pass, and then vice versa. These BBIS beacons 120 would have attenuated receivers and lower powered transmitters to handle shorter-range duties, and would be triggered by the traffic personnel, preferably on-site. The temporary BBIS beacons 120 would alternately broadcast a "hold in place" message, whose broadcasts would be synchronized to traffic personnel's hand signs (for non-autonomous vehicles).

In general, therefore, the present invention utilizes a network of BBIS beacons 120 that can exchange contextual information about roadway conditions, either pre-programmed (such as, for planned construction and road closings, for bridge or road conditions and limitations, for buses, slow moving vehicles, or emergency vehicles, or for known dangerous roadways) or for immediate and unexpected conditions (such as car accident, bridge collapse, road damage, fallen tree, etc.), and thereby facilitate dynamic operation of autonomous vehicles 110 in a quicker and more safe manner. Beacons 120 can be stationary—that is permanently provided by the side of a roadway, or temporarily at the sight of a roadway condition—and feed contextual travel information to approaching vehicles 110 or even other vehicles 110 in the general vicinity in advance of arrival at the roadway condition. BBIS beacons 120 could also be mobile and located in numerous vehicles, which can exchange traffic and roadway condition information directly with each other as they are moving, or through a centralized or localized information center, or to and from stationary beacons. Each vehicle 110 preferably includes a processing system, such as a CAN Bus 130, as illustrated in FIG. 4, for receiving and processing contextual information received from other beacons 120 or an information center, and also for sending relevant contextual information to assist other vehicles 110 when a roadway condition is found.

Other, more specific scenarios can also be addressed by embodiments of the BBIS 100 in accordance with the present invention. For example, the BBIS 100 can be advantageous of assisting police, fire and other emergency vehicles at the site of an accident or emergency situation. Similarly, the BBIS 100 can used to assist construction crews, especially where the travel lanes are reduced or shifted to accommodate roadwork. The BBIS 100 is also useful at exit ramps, tunnels, stop signs and light, parking garages, at railroad crossing or bridges, with neighborhood access gates, and during rush hour commutes. These and other specific scenarios are discussed further below.

Police, Fire, and other emergency vehicles equipped with BBIS beacons 120 would not only have the ability to notify oncoming traffic of any abnormal blockage, construction, reduced travel lanes, or other activity on a roadway, or of any stopped police, fire or other emergency vehicles on the side of a roadway (as a "conventional" V2V system might function), but it would also be uniquely capable of providing approaching autonomous vehicles 110 with speed limit and directional positional guidance instructions so that operation of those vehicles, and indeed rerouted of vehicles as appropriate, could be adjusted. For example, signals can be sent from emergency vehicle beacons 120 (and/or nearby stationary beacons 120A or temporary beacons 120C, 120D) to force vehicles 110 to reduce speed when approaching a situation, or to shift to one or more designated lanes (e.g., left two lanes), even into what is normally a travel lane in the opposite direction, to create a "protective zone" around rescue worker operations to comply with "move-over" laws in many states or open up a pathway for emergency vehicles to be able to circumvent traffic to get to the site of an accident or emergency.

A BBIS beacon 120 carries by a law-enforcement vehicle could have the capability to remotely immobilize any vehicle 110 within a set geographic area, or immobilize a specific VIN that would be linked to a BBIS-equipped vehicle's on-board database. Taking advantage of the BBIS's two-way capabilities, police vehicles could be equipped with special BBIS implementation that would request each BBIS-equipped vehicle 110 to transmit its VIN, which would automatically be matched against a listed of wanted vehicles.

A BBIS beacon 120 may be used to prohibit passage of any or certain autonomous vehicles 110 into a temporary or permanent exclusion zone by explicitly commanding vehicular immobilization to any such vehicle 110 within a defined geometric radius of said beacon 120. Alternatively, the BBIS beacon 120 could command any vehicle 110 to reverse course and transit away from the exclusion zone. Indeed, many roadways, tunnels and bridges strictly prohibit vehicles 110 that are carrying Haz-Mat rated materials from entering or transiting such materials. One of the fields on a BBIS on-board database concerns the applicability of a vehicle 110 to transport Haz-Mat materials. If this field is listed as "applicable", then any vehicle 110 that is BBIS-equipped and is operating near a location broadcasting a Haz-Mat prohibition would be implicitly prevented from entering and operating in the restricted area. The BBIS beacon 120, in addition to broadcasting a prohibition signal, would also provide alternate non-Haz Mat regulated alternate routes to the vehicle 110.

Similarly, a BBIS-equipped vehicle that is carrying Haz-Mat materials that is involved in an accident and/or overturned could immediately and automatically transmit an exclusion zone command around itself, and simultaneously notify Haz-Mat first responders of the emergency situation.

Motorized gate controlled facility entrances along a route, whether at private locations or at public facilities, such as parking garages, present a threshold problem to autonomous vehicles. At a facility without an implemented BBIS beacon 120, an autonomous vehicle 110 would have to identify an object such as a motorized access gate (from all the different types, sizes, shapes, and color variations), then determine what the object is and does, and then in what state the object is (e.g., gate open or closed). If the gate were in a "closed" or "down" state, the vehicle 110 would not be able to proceed further unless it recognized that it had to open that type of gate (which typically would require a unique entry code or data sequence), but also would need the on-board logic and physical means to do so. Given that most facilities use either site-specific proximity cards or radio-frequency transmitters to validate an entry attempt, even if an autonomous vehicle 110 had made it to this point in an access scenario, it would still face extreme logistical challenges in physically matching the wide range of potential validation methods used at multiple sites to the specific site location needed at the moment.

When a BBIS beacon 120 in accordance with the present invention is installed at an access gate location, any autonomous vehicle 110 that is equipped with the corresponding BBIS-compatible equipment is suddenly able to access a gated entrance in a routine and effortless manner. At such a location, a BBIS gate beacon 120 associated with the entrance would continually broadcast data bursts that would indicate to any nearby autonomous vehicles 110 (that possessed BBIS capability) that a gate or other access control with a site designator of "x" exists there, as well as informing the vehicle 110 of the status of the access control (e.g. "closed and needing an entry code"), and the type of specific coded response needed to authorize passage. If the vehicle 110 (via the BBIS equipment) recognized that the site code of this location matched the ID of a gate that is a part of the vehicle's trip, it replies to the gate beacon 120 with an access code, which passes the authorization to the gate opener, which then opens the gate for the vehicle 110. When the gate reaches the open position, the gate beacon 120 signals the vehicle 110 to proceed.

For public facilities, such as parking garages, payment accounts would be set up and upon entry of an autonomous vehicle 110, the vehicle's BBIS transmitter would send the garage beacon 120 the vehicle's identity code which would be passed along to the facility's access/billing system. When the aforementioned vehicle 110 exited the facility, the BBIS garage beacon 120 would again request the vehicle's identity information to calculate the duration of stay and complete the billing for that parking session. By having the BBIS equipment directly communicate with a site's access control system, it eliminates the need for a host vehicle to be equipped with multiple radio access transmitters, proximity cards, access transponders, etc. A BBIS beacon 120 installed at a parking garage or parking lot could prevent an autonomous vehicle 110 from entering any parking facility that was "full" and had no remaining parking capacity. In addition to the entry denial, the BBIS garage beacon 120 could optionally send further guidance information to an autonomous vehicle 110 that would direct it to the nearest lot with available parking capacity. In the future world of ubiquitous autonomous vehicles, this would be ideally suited for airports, public venues, etc., wherein an autonomous vehicle 110 drops the passenger/owner off and parks itself until summoned.

Traffic control gates that are part of the roadway system, such as gates at drawbridge openings or toll booths, utilizing a "traditional" V2I beacon would only allow autonomous vehicles 110 to know that the gate was at a particular location, but would leave how such vehicles 110 responded to the presence of the gate to the vehicle's own guidance systems. With a BBIS-equipped drawbridge, for example, the BBIS bridge beacon 120 would not only appropriately halt the traffic before a bridge opening, but also give "resume travel" commands to the waiting vehicles 110 at the appropriate time as well. In the event that the bridge opening mechanism stopped working while the bridge was still in the raised position, a non-BBIS equipped vehicle would just continue to sit there. With a BBIS-equipped AV, the BBIS bridge beacon 120 would instruct the BBIS-equipped vehicles 110 to back up, turn around, and follow new optimum detour waypoints (which may have been previously determined for this eventuality) which would be sent to the vehicle's guidance systems for execution.

Railroad crossings without automatic gates and/or signaling devices require vehicular drivers to "Stop, Look, Listen". Since autonomous vehicles 110 cannot inherently be relied upon to differentiate between nearby stationary trains and those coming towards them at 60 MPH or more, a railway crossing that was equipped with a BBIS beacon 120 would not only alert an autonomous vehicle 110 as to the presence of a railway crossing, but most critically the BBIS RR beacon 120 would be in control of any vehicle 110 that was at the threshold of a railroad crossing or wished to cross the tracks. Each BBIS RR beacon 120 at a railroad crossing would be data connected to the local-area railway system so it would know exactly where the railway traffic was at any given time. If there were no pending railway traffic at a particular vehicular crossing, then the beacon's vehicular command output would remain idle. Should there be railway traffic in the vicinity, then the BBIS RR beacon 120 would send explicit "hold in place" commands to any vehicles 110 just outside of the railroad crossing until the railway traffic had passed. Most beneficially, should an autonomous vehicle 110 get fully or partially stuck on the railway tracks for longer than a pre-determined time, then the BBIS RR beacon 120 would send a special "escape" protocol to the vehicle 120 to cause it accelerate forwards or backwards, or to rock back and forth, or to change the direction of steering periodically to try and free the stuck vehicle. If the BBIS RR beacon 120 continued to sense a vehicle 110 still on the tracks for more than a pre-determined time frame, then the vehicle beacon 120 would cause the autonomous vehicle 110 to unlock all the doors and play an increasingly loud "evacuate now!" message in the vehicle's interior. Simultaneously, the BBIS RR beacon 120 would send an "immobile vehicle on the tracks at [location]" message to the railroad train signaling system to halt the train traffic in the area of that crossing.

The BBIS 100 in accordance with the present invention is also useful at stop signs traffic lights, and rotaries. While a standard V2I system is able to communicate to an autonomous vehicle the presence of a "four-way" stop sign-controlled intersection, there is a challenge in having autonomous vehicles 110 determine the correct order of passage, especially if multiple vehicles 110 converge on such an intersection simultaneously. With a stationary BBIS beacon 120 positioned at this type of intersection, the beacon 120 goes beyond merely informing an BBIS-compatible autonomous vehicles 110 of the intersection type, by requesting that each vehicle 110 entering into that intersection transmit a random number back to the beacon 120. The beacon 120 sends out "hold" instructions to each vehicle 110 at the intersection, and then the beacon 120 sequentially sends command instructions to the vehicles 110 in a First In First Out (FIFO) manner allowing each vehicle to proceed in a timely and efficient manner.

A BBIS beacon 120 inherently brings anti-gridlock abilities to every intersection. In addition to identifying a traffic signal-controlled intersection as such, by linking the signaling equipment at an intersection with a BBIS beacon 120, a vehicle control signal may be sent by the BBIS beacon 120 to each vehicle attempting to enter said intersection which would hold a vehicle at the "stop" line if it is within a predefined time period of the next signal change. This would effectively prevent any vehicle(s) 110 from entering the intersection at a time when it could create a "block the box" condition. The BBIS beacon 120 could also optimally coordinate movement of vehicles 110 through a back-up, especially where vehicles 110 are looking to make left-hand turns across traffic, or merge from multiple lanes to one lane for egress, by alternating vehicular movements until the back-up is eased.

A BBIS beacon 120 installed in advance of the entrance to an arch bridge or tunnel would broadcast to vehicles 110 the maximum vehicular heights allowed in each lane. If a vehicle 110 were too tall to use just one of the lanes, vehicular-installed BBIS equipment would automatically explicitly instruct the vehicle 110 to change to the travel lane that would allow safe passage. If neither lane could be safely utilized, then the BBIS equipment would completely halt the vehicle 110, or if possible, re-route the vehicle 110 around that bridge using a different route.

In tunnels and other areas where GPS signals are not available, many traditional autonomous guidance systems can experience great navigation difficulties. Accordingly, BBIS beacons 120 can be easily located throughout a tunnel, obviating any issues with signal strength. Further complications occur when vehicles 110 are presented with multiple exits in the tunnel itself, which often immediately lead to left or right turning lanes immediately after the exit is taken. While autonomous vehicles 110 can attempt to navigate by video guidance and/or "dead reckoning" means, the highway speeds at which directional decisions need to be made, typically under poor lighting conditions, are extremely problematic without BBIS guidance. With a BBIS approach 100, the BBIS beacons 120 within the tunnel would send the upcoming exit configuration and vehicular movement biasing or explicit instructions to the BBIS-equipped vehicle 110, which is guided as easily as if it were not in a tunnel. In extremely long, straight tunnels, an autonomous vehicle's guidance system would normally attempt to pass slower traffic in that lane if the subject vehicle's speed slowed down excessively and there were clear adjacent lanes. Many such tunnels, however, have explicit "stay in line" restrictions. With BBIS beacons 120 installed in said tunnel, any BBIS-equipped vehicle 110 would receive explicit commands to "stay in Line". A BBIS beacon 120 located at the end of the tunnel would rescind those instructions. In the event of an accident in a tunnel, traffic converging on the accident scene may not be aware of the situation, and would eventually add to a slowdown in traffic as vehicles attempt to spontaneously merge at the accident scene. With a BBIS implementation, video monitoring by the traffic authority would almost immediately know the location and lane(s) of an immobile object(s). By having a BBIS beacon 120 well in advance of the accident commanding traffic to merge into only open lane(s), traffic delays through the tunnel are minimized.

As with tunnels, there are many highway exits that are, in reality, multiple exits joined with one common off-ramp. There are times when these configurations can be challenging even to a human driver, who needs to grasp multiple directional choices within a small area typically in traffic at high speed. The presence of extreme weather, such as fog or snow, can further complicate decision-making for both autonomous vehicles as well as human drivers. BBIS beacons 120 have the ability to continually broadcast multiple sequential messages (if needed) to indicate "exit 'x' left lane", "exit 'y' center lane", "exit 'z' right lane", etc., as well as guidance instructions to begin moving the vehicles 110 towards the appropriate direction and lane as soon as the messages are received. Furthermore, the BBIS approach 100 can coordinate multiple vehicles 110—which essentially interact with one another via their respective beacons 120, to ensure that each vehicle is directed where it needs to go. Additionally, there are many limited-access roadway exits that are located on the "left" side of a highway. A stationary BBIS beacon 120, in addition to broadcasting an exit number (such is the case with conventional V2I beacons), would also send commands to an autonomous vehicle 110 wishing to take that exit to change lanes to the appropriate side of the road in anticipation of taking such exit.

By placing a BBIS beacon 120 in "special" areas, such as near residences with hearing or visually impaired persons, all BBIS compatible vehicles 110 could have their speed, braking, and sensor calibrations appropriately optimized in anticipation of possible sudden interactions with an impaired individual who could have reduced awareness of an autonomous vehicle. It is expected that ultimately almost all vehicles on public roadways will be electric powered. A developing problem with electric vehicles is that because of their extremely low noise signature, they present a danger to sight-impaired and hearing-impaired persons not being able to hear an oncoming vehicle. Recent legislation is now moving to require all electric vehicles to emit a constant source of additional sound to alert sight-impaired individuals of an electric vehicle's presence. Rather than flood a community with constant unnecessary additional noise, a far superior approach would be to have a portable BBIS beacon 120 carried by a sight-impaired or hearing-impaired person, which would not only "advertise" their presence to passing vehicles 110, but also command only vehicles in the immediate vicinity of need to turn on extra sound.

BBIS beacons 120 are also extremely useful if they not only broadcast a street address to passengers, but also direct an autonomous vehicle 110 directly into a preferred driveway or parking location. Many cities and towns have prohibitions against "on-street" parking between certain hours, or during snow emergencies. A BBIS beacon 120 at an address could automatically move a vehicle 110 to an allowable location during restricted hours to avoid having the vehicle cited and/or towed. Similarly, many properties have preferred entrance locations, dedicated employee entrances, dedicated delivery entrances, unidirectional entrances and exits, etc. Many of these locations for various reasons tend to modify the location of these passageways over the years which typically does not get reflected on GPS base maps. BBIS beacons 120 at these access points supply effortless guidance to vehicles 110, which otherwise would have great difficulty in correctly figuring out and dealing with such situations. In the case of a vehicle 110 attempting to go against traffic flow by incorrectly attempting to use a wrong entrance, the BBIS beacon 120 would send out an implicit "halt and reverse course" command to the vehicle 110.

Many communities have installed so-called "bike lanes" which have implications for autonomous vehicle guidance. Roadways with bike lanes typically call for a three-foot minimum separation between the widest point of a vehicle and the bicycle. A conventional V2I beacon merely informs autonomous vehicles 110 to the existence of a bike lane, but a BBIS implementation in accordance with the present invention would automatically instruct an autonomous vehicle 110 to bias its normal vehicle-to-curb distances by three feet, and further require additional separation biasing and/or speed reduction, if needed, due to a cyclist encroaching on a vehicular lane. If there is no marked "bike lane" and there is cycling activity, if a cyclist happens to be carrying a portable BBIS beacon that indicates cycle existence, an autonomous vehicle 110 could respond in a similar "bike lane" reactive manner.

Customs examination stations that are equipped with BBIS equipment would also greatly benefit in numerous ways. First, by querying vehicles to determine the subject vehicle's country of origin, BBIS beacons 120 could automatically direct said vehicles 110 into the appropriate vehicular inspection lanes based on country of origin. For autonomous vehicles 110 that had been previously inspected and previously sealed, BBIS beacons 120 could automatically direct those vehicles 110 through a bypass at the facility in a timely and efficient manner. Further, customs examination stations that are equipped with BBIS equipment could also automatically direct vehicles through "X-Ray", Radioactive, or other inspection equipment, and automatically direct the vehicles 110 appropriately depending on the results of the inspection. Similarly, highway weigh/inspection stations equipped with BBIS beacons 120 could automatically query approaching vehicles 110 to determine their "commercial" status, vehicular type, weight, "Haz-Mat" or other criteria, and automatically direct the vehicles 110 to leave the roadway and enter the facility. These facilities typically are only manned during certain hours and/or days, so the BBIS beacons 120 would dynamically operate accordingly.

There are times when an oversized vehicle or a vehicle that is carrying an object that extends beyond the rear of a vehicle itself, or an unusual vehicle such as a tandem tractor-trailer setup is operating on a roadway. With these non-traditional vehicles, there is a great likelihood of an autonomous vehicle 110 not being able to correctly identify this type of vehicular configuration, and as a result not being able to correctly adjust its guidance characteristics to allow for a proper following distance. The use of a BBIS 100 allows any "non-traditional" vehicular configuration to automatically re-configure the guidance parameters for a following vehicle 110 to maintain a safe and proper separation between itself and the vehicle ahead, while also providing "do not pass" instructions to the following vehicle 110. This system 100 can also implicitly command additional spacing needed to a following vehicle 100 to comply with, for instance, a fire department vehicle requiring a "keep back 'x' feet" separation.

In operation, BBIS beacons 120 in accordance with the present invention could be used to advertise upcoming "points of interest" such as gas or charging stations, rest areas, specific restaurant brands or categories of restaurants to occupants of autonomous vehicles 110. This information could optionally be displayed on information screens installed in such vehicles 110, thereby giving a passenger an option of altering the route to stop at a selected point of interest. The information about a certain point of interest or location does not have to be in close proximity to an appropriate exit, but instead it could be included in a constantly updating list to allow a vehicle's passengers to enter a waypoint for a future part of a trip (e.g., in 20 miles).

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A system for transmitting contextual travel information to a plurality of vehicles on a roadway comprising:
   at least one bi-directional beacon including transmission means and receiver means for sending and receiving data relating to contextual travel information for assisting in operation of the plurality of vehicles on the roadway,
   wherein said at least one bi-directional beacon is positioned on a first vehicle or on a non-vehicle element such that said at least one bi-directional beacon is within range to transmit data to and/or receive data from vehicles traveling on the roadway, and
   wherein said at least one bi-directional beacon is configured to transmit data that is vehicle-specific to each vehicle of the plurality of vehicles based on information received by said at least one bi-directional beacon from each vehicle of the plurality of vehicles such that each data of the transmitted data is specific to the vehicle receiving the data.

2. The system according to claim 1, comprising a plurality of said at least one bi-directional beacons capable of communicating with one another.

3. The system according to claim 2, wherein the plurality of said at least one bi-directional beacons comprises a first bi-directional beacon positioned on said first vehicle and adapted for communication with a second bi-directional beacon positioned on one of the non-vehicle element or a second vehicle.

4. The system according to claim 3, wherein the first vehicle is an autonomous vehicle and is configured to process data received from said at least one bi-directional beacon with a processor disposed on the first vehicle in operative communication with the first vehicle's autonomous operating systems.

5. The system according to claim 2, wherein the plurality of at least one bi-directional beacons comprises a first bi-directional beacon positioned on the non-vehicle element and adapted for communication with the plurality of vehicles as they pass by said non-vehicle element on the roadway, each vehicle of the plurality of vehicles being equipped with a bi-directional beacon of the plurality of at least one bi-directional beacons to which a first bi-directional beacon of the plurality of at least one bi-directional beacons is configured to transmit data relating to contextual vehicle-specific travel information.

6. The system according to claim 5, wherein the non-vehicle element is movable to different locations with respect to the roadway.

7. The system according to claim 1, wherein the at least one beacon is remotely programmable with travel information.

8. The system according to claim 1, wherein the data includes vehicle operation commands.

9. The system according to claim 1, wherein the transmission means comprises a transmitter and the receiver means comprises a receiver.

10. The system according to claim 1, wherein the transmission means and the receiver means comprise a transceiver.

11. A system for transmitting contextual travel information to vehicles on a roadway comprising:
a plurality of autonomous vehicles, each having a processor in operative communication with the respective vehicle's autonomous operating systems, and a bi-directional beacon system in operative communication with the processor,
wherein said bi-directional beacon system includes transmission means and receiver means for sending and receiving data relating to contextual travel information for assisting in operation of the plurality of autonomous vehicles on the roadway, and
wherein the data received by each vehicle of the plurality of autonomous vehicles is vehicle-specific to each vehicle of the plurality of autonomous vehicles receiving the data based on information received by said bi-directional beacon from each vehicle of the plurality of autonomous vehicles, and the data received by each vehicle is processed by the processor for assisting in operation of each vehicle of the plurality of autonomous vehicles.

12. The system according to claim 11, further comprising at least one non-vehicle support, said at least one non-vehicle support including a bi-directional beacon having transmission means and receiver means for sending and receiving data relating to travel information for assisting in operation of the plurality of autonomous vehicles on the roadway,
wherein data is exchanged between the beacon of the at least one non-vehicle support and beacons on vehicles on the roadway.

13. The system according to claim 12, wherein the at least one non-vehicle support is movable to different locations with respect to the roadway.

14. The system according to claim 11, wherein said bi-directional beacon system comprises a plurality of bi-directional beacons, and wherein each bi-directional beacon of said plurality of bi-directional beacons is remotely programmable with travel information and/or vehicle information.

15. The system according to claim 11, wherein the data includes vehicle operation commands.

16. The system according to claim 11, wherein the transmission means comprises a transmitter and the receiver means comprises a receiver.

17. The system according to claim 11, wherein the transmission means and the receiver means comprise a transceiver.

18. The system according to claim 1, wherein the contextual travel information is based on information provided to the at least one bi-directional beacon by the plurality of vehicles that have traveled on the roadway or are traveling on the roadway.

19. The system according to claim 1, wherein the at least one bi-directional beacon is associated with an access controlled location and transmits a signal identifying the at least one bi-directional beacon as being associated with the access controlled location and/or requesting an access code, and wherein the at least one bi-directional beacon authorizes access to the access controlled location when the at least one bi-directional beacon receives the access code from a vehicle.

20. The system according to claim 1, wherein the data is based upon at least one vehicle-specific information, the vehicle-specific information comprising a vehicle identification number of the respective vehicle, State motor vehicle license-plate information of the respective vehicle, vehicle type of the respective vehicle, vehicle size of the respective vehicle, vehicle height of the respective vehicle, vehicle weight of the respective vehicle, haz-mat applicability of the respective vehicle, number of passengers of the respective vehicle, amount and weight of luggage or stowed items of the respective vehicle, vehicle capability and/or suitability for contextual travel on a specific section of roadway of the respective vehicle, remaining range capability of the respective vehicle, maintenance status of the respective vehicle, home location of the respective vehicle, or destination location of the respective vehicle.

21. The system according to claim 1, wherein the at least one bi-directional beacon is provided in a traffic cone, temporary signage, emergency light, or emergency flare.

22. The system according to claim 1, wherein communications between the at least one bi-directional beacon and the vehicles are dynamically interactive.

23. The system according to claim 1, wherein the data comprises a command, wherein the at least one bi-directional beacon is configured to send the command to each vehicle of the plurality of vehicles based on information communicated to the at least one bi-directional beacon from each vehicle of the vehicles, respectively.

24. The system according to claim 23, wherein the command overrides an autonomous vehicle movement protocol of each vehicle of the plurality of vehicles that is an autonomous vehicle.

25. The system according to claim 11, wherein the contextual travel information is based on information provided to the bi-directional beacon system by a plurality of vehicles that have traveled on the roadway or are traveling on the roadway.

26. The system according to claim 11, wherein the bi-directional beacon system is associated with an access controlled location and transmits an access signal to an entrance beacon or gate beacon, and wherein the bi-directional beacon system authorizes access to the access controlled location when the entrance beacon or the gate beacon of the bi-directional beacon system receives the access signal from a vehicle that is validated by the bi-directional beacon system.

27. The system according to claim 11, wherein the data is based upon at least one of vehicle-specific information, the vehicle-specific information comprising a vehicle identification number of the respective vehicle, State motor vehicle license-plate information of the respective vehicle, vehicle type of the respective vehicle, vehicle size of the respective vehicle, vehicle height of the respective vehicle, vehicle weight of the respective vehicle, haz-mat applicability of the respective vehicle, number of passengers of the respective vehicle, amount and weight of luggage or stowed items of the respective vehicle, vehicle capability and/or suitability for contextual travel on a specific section of roadway of the first vehicle, remaining range capability of the respective vehicle, maintenance status of the respective vehicle, home location of the respective vehicle, or destination location of the respective vehicle.

28. The system according to claim 11, wherein the bi-directional beacon system is provided in a traffic cone, temporary signage, emergency light, or emergency flare.

29. The system according to claim 11, wherein communications between the bi-directional beacon system and the vehicles are interactive.

30. The system according to claim 11, wherein the data is based on an access signal received by an entrance beacon or a gate beacon of the bi-directional beacon system from a vehicle of the plurality of autonomous vehicles which contains a known valid access capability authorization.

31. The system according to claim 11, wherein the data comprises a command.

32. The system according to claim 31, wherein the command to each vehicle of the plurality autonomous vehicles is based on information communicated to the bi-directional beacon system from each vehicle of the plurality of autonomous vehicles, respectively.

33. The system according to claim 31, wherein the command overrides an autonomous vehicle movement protocol of each vehicle of the plurality of autonomous vehicles.

34. A system for transmitting contextual travel information to vehicles on a roadway comprising:
at least one beacon configured to send and receive data relating to contextual travel information for assisting in operation of said vehicles on the roadway;
wherein said at least one beacon is positioned on one of a non-vehicle support or a first vehicle; and
wherein communications between the at least one beacon and at least one vehicle of the vehicles are vehicle-specific to each vehicle of the vehicles based on information received by said at least one beacon from each vehicle of the vehicles such that each communication of the communications is specific to the vehicle receiving the communication.

35. The system according to claim 34, wherein the at least one beacon is configured to send a command to at least one vehicle of the vehicles.

36. The system according to claim 35, wherein the command is based on information communicated to the at least one beacon from each vehicle of the vehicles, respectively.

37. The system according to claim 35, wherein the command overrides an autonomous vehicle movement protocol of each vehicle of the vehicles that is an autonomous vehicle.

38. The system according to claim 1, wherein the data comprises a command that is coded as suggested or mandatory.

39. The system according to claim 1, wherein the data comprises an instruction for each vehicle of the plurality of vehicles to determine a new route of travel, and wherein the new route of travel for each respective vehicle is different from a previously determined route of travel for each respective vehicle.

40. The system according to claim 1, wherein the bi-directional beacon is associated with a lead vehicle, and wherein the data comprises an instruction to pass the lead vehicle depending on a state of the lead vehicle.

41. The system according to claim 40, wherein the lead vehicle is a delivery vehicle, a garbage collection vehicle, a street sweeper, or a school bus.

42. The system according to claim 1, wherein the data comprises a "Local Traffic Only" instruction that instructs the vehicles of the plurality of vehicles receiving the instruction to determine a new route that avoids one or more streets, and/or instructs the vehicles of the plurality of vehicles to proceed to the one or more streets if the vehicle has a home location within the one or more streets.

43. The system according to claim 1, wherein the bi-directional beacon is associated with a railroad crossing, wherein the bi-directional beacon is in communication with a railway system for determining a location of railway traffic, and wherein the bi-directional beacon is configured to transmit a "hold in place" instruction when the rail way traffic is in a vicinity of the railroad crossing.

44. The system according to claim 1, wherein the bi-directional beacon is associated with an entrance of an arch bridge or an entrance of a tunnel, wherein data comprises an instruction to use a particular roadway lane based on a height of each vehicle of the plurality of vehicles.

45. The system according to claim 44, wherein the data comprises an instruction to stop or properly re-route each vehicle of the plurality of vehicles with a height greater than a maximum permitted height for the arch bridge or the tunnel.

46. The system according to claim 1, wherein the bi-directional beacon is associated with a hearing or visually impaired person, and wherein the data comprises an instruction for each vehicle of the plurality of vehicles that is an electric vehicle to emit a sound.

47. The system according to claim 1, wherein the bi-directional beacon is associated with a restricted area, wherein vehicle parking or a particular direction of vehicle travel is not permitted in the restricted area during certain times, and wherein the data comprises guidance to instruct each vehicle of the plurality of vehicles to not park and/or travel in the particular direction of vehicle travel in the restricted area during the certain times.

48. The system according to claim 1, wherein the bi-directional beacon is associated with a bicycle lane, wherein the data comprises an instruction for each vehicle of the plurality of vehicles to maintain a predetermined distance from a curb of the roadway.

49. The system according to claim 1, wherein the bi-directional beacon is associated with a customs examination station, and wherein the bi-directional beacon queries a country of origin of each vehicle of the plurality of vehicles, and wherein the data comprises an instruction to proceed to a particular vehicular inspection lane based on the country of origin of each respective vehicle of the plurality of vehicles.

50. The system according to claim 1, wherein the bi-directional beacon is associated with a vehicle carrying an object that extends beyond a rear of the vehicle carrying the object, and wherein the data comprises an instruction to maintain a safe and proper separation distance and/or an instruction to not pass the vehicle carrying the object.

* * * * *